July 25, 1967

F. COLAS 3,332,265

METHOD AND APPARATUS FOR MANUFACTURING
CONICAL AND CYLINDRO-CONICAL TUBES

Filed Nov. 4, 1964

INVENTOR.
FRANÇOIS COLAS
BY
Nina M. S. Lawrence

INVENTOR.
FRANÇOIS COLAS
BY
Nina M S Lawrence

F. COLAS 3,332,265

METHOD AND APPARATUS FOR MANUFACTURING
CONICAL AND CYLINDRO-CONICAL TUBES

Filed Nov. 4, 1964

_Fig. 7_

_Fig. 8_

INVENTOR.
FRANÇOIS COLAS
BY

Nina M S Lawrence

July 25, 1967  F. COLAS  3,332,265
METHOD AND APPARATUS FOR MANUFACTURING
CONICAL AND CYLINDRO-CONICAL TUBES
Filed Nov. 4, 1964  6 Sheets-Sheet 6

_Fig. 11_

_Fig. 12_

_Fig. 13_

INVENTOR.
FRANÇOIS COLAS
BY

United States Patent Office 3,332,265
Patented July 25, 1967

3,332,265
METHOD AND APPARATUS FOR MANUFACTURING CONICAL AND CYLINDRO-CONICAL TUBES
Francois Colas, Bourg-la-Reine, France, assignor to l'Aluminium Francais, a corporation of France
Filed Nov. 4, 1964, Ser. No. 408,934
Claims priority, application France, Nov. 8, 1963, 953,120; Apr. 8, 1964, 970,082
20 Claims. (Cl. 72—49)

ABSTRACT OF THE DISCLOSURE

A method of manufacturing conical tubes in which a strip of variable width is produced having substantially the shape of an elongated trapeze by a graphic procedure from the traced evoluted surface of a cone frustum with vertex angle $\alpha$. The strip is wound as pseudo-helix of continually variable diameter, the strip forming with the axis of the pseudo-helix an angle equal to $\pi$ sine $\alpha/2$ radians. An apparatus for manufacturing conical tubes from strip having a mobile drum with a curved travel path for feeding strip and guide rollers inclined to the horizontal at an angle equal to half the angle of the vertex of the desired conical tube.

---

The present invention relates in general to a method of manufacturing or producing conical and cylindro-conical tubes and to the equipment or apparatus for applying this method.

The method of making conical tubes by moving trapezoidal collars and welding along a generatrix is known. The elements of the conical tube thus obtained are then joined to each other by circular welding.

This method does not permit highly effective rationalization of the manufacturing process and, furthermore, causes considerable loss of metal, due to the cutting out of the trapezes. Hence, it is uneconomical.

A method is also known for manufacturing conical tubes from metal strips which are wound spirally and then soldered edge on edge or edge to edge. Such a method was described in an article by A. A. Pfeifer which appeared in the American periodical "Product Engineering" of April 15, 1963, under the title, "How To Lay Out Spiral-formed Welded Tapered Cylinders." According to this method, the cone is evoluted in accordance with a generatrix and polar transformation is effected of the evoluted surface obtained. The strip resulting from this is cut, wound spirally and welded edge to edge. The author does not give any details as to how the last two operations are performed.

This method presents serious disadvantages:

Spiral winding is accomplished by taking as reference the axis of the trapezoidal figure constituted by the strip and this appears difficult to achieve in actual practice.

The cutting out of the strip from a rectangular strip gives rise to considerable loss of metal.

It is impossible to obtain from one same strip combined and cylindrical surfaces.

Thus, this method does not permit industrially practicable and economical manufacture.

It is, therefore, an object of the present invention to provide a method for manufacturing conical tubes which eliminates the aforementioned disadvantages.

It is an object of the present invention to provide a method of manufacturing conical tubes which is industrially feasible and economical.

It is also an object of the present invention to provide a method of manufacturing conical tubes from a rectangular strip, the whole of which can be utilized as its raw material.

It is an object of the present invention to furnish a method which can also be applied to manufacturing cylindro-conical tubes.

It is a further object of the present invention to provide the apparatus or equipment for the manufacture of conical and cylindro-conical tubes.

The conical and cylindro-conical tubes obtained by the application of these methods and/or equipment also constitute the subject of the instant invention.

In accordance with the method of the present invention, a strip of variable width is obtained having virtually the shape of a considerably elongated trapeze, then this strip is wound into a pseudo-helix with continually variable diameter and the adjacent edges are joined by any means, such as welding, spot-welding, hard-soldering, pinning, and the like. This method is characterized by the fact that first of all there is laid out an evoluted surface ABDC of the cone frustum with a vertex angle $\alpha$ which it is desired to obtain and rectilinear sides AC and BD of the curvilinear trapeze obtained are extended to their intersection at S. Then we draw the circle ($\Gamma1$) circumscribed about the triangle formed by S and the vertices of one of the bases of the trapeze ABDC, and another circle ($\Gamma2$) with center S passing through the two vertices of the other base of said trapeze. On circle ($\Gamma1$) a point $\Sigma$ is taken which is joined to the two vertices of the trapeze through which circle ($\Gamma1$) passes. The two straight lines thus obtained cut the circle ($\Gamma2$) at points P and Q respectively. A strip is cut according to the curvilinear trapeze limited by the straight lines $\Sigma$P and $\Sigma$Q and the circles ($\Gamma1$) and ($\Gamma2$). This strip is wound as a pseudo-helix with continually variable diameter, the strip forming with the axis of the pseudo-helix an angle $\alpha$ equal to: $\pi$ sine $\alpha/2$ radians.

The equipment or apparatus according to the invention includes:

A strip feeding drum movable on a winding trajectory inclined towards the horizontal, according to an arc of a circle.

At least two guide rollers inclined to the horizontal at an angle equal to half the vertex angle of the cone to be obtained.

A mandrel with variable profile having at least one cylinder split at least partially according to a generatrix and in which the winding of the strip is effected.

According to a preferred mode of applying the invention, the mandrel with variable profile comprises a cylinder at least partially split according to a generatrix, with an interior diameter greater than the greatest diameter of the base of the tubes to be manufactured and having apertures in each of which a guide shaft or rod is engaged. The outside of said shaft or rod is fastened to a cam integral with a housing (gear box) actuated by a to-and-fro movement and surrounding the split cylinder. The inner end of the shaft or rod is provided with a device facilitating the sliding of the ribbon, such as a mobile roller, a mobile sphere, a fixed self-lubricating sphere, a fixed lubricated sphere, and the like.

The attached drawings will serve to facilitate understanding of the present invention and are not limitative thereof.

FIGURES 7 and 8 are schematic drawings of the equipment for the manufacture of truncated cone shaped tubes.

On FIGURES 1 to 6 on the one hand, and FIGURES 7 to 13 on the other, the same reference numbers represent the same elements.

Figures 1, 2:
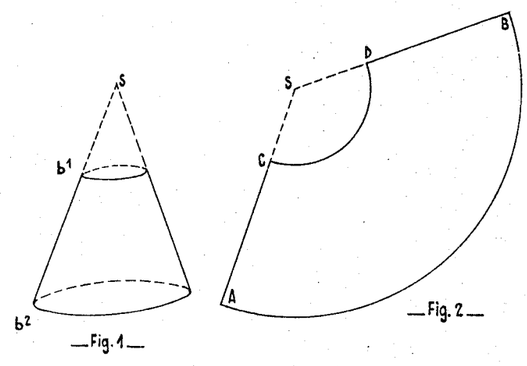
FIGURE 1 is a view in perspective of the frustum of a cone to be obtained.
FIGURE 2 represents the unfolded or evoluted surface of the cone frustum.

The frustum of the cone to be obtained is represented in FIGURE 1; it is enclosed between the bases ($b^1$) and ($b^2$) of a cone of revolution with vertex S. The evoluted surface of this cone is shown in FIGURE 2. It is a curvilinear trapeze with vertex S, having two curvilinear sides AB and CD, which are arcs of a circle with center S, and two rectilinear sides AC and BD which pass through S.

Let us assume that:

$\alpha$ is the angle at the vortex of the cone $h$ is its height, that is to say the distance from S to the plane ($b^2$)

$l$ is the length of the generatrix of the frustum of the cone $d_2$ is the diameter of the circle constituting the base ($b^2$)

$d_1$ is the diameter of the circle constituting the base ($b^1$)

The length of arcs $\widehat{AB}$ and $\widehat{CD}$ is given by: $\widehat{AB} = \pi \cdot d_2$, and $\widehat{CD} = \pi \cdot d_1$.

The angle of opening of the curvilinear trapeze ABDC is given by: $\widehat{ASB} = 2\pi \sin \alpha/2$.

For convenience, the angle $\alpha$ is exceedingly exaggerated in FIGURES 1 and 2 and to a lesser extent in the following figures.

There is a known method of obtaining a cone frustum by using a strip shaped like a very elongated trapeze which is wound like a pseudo-helix and welded edge to edge or edge on edge.

Applicant presents a new graphic method permitting determination of the strip to be wound in such a way that the winding can be made edge to edge with the ends perfectly level without needing alignment. This process, furthermore, permits total utilization of a rectangular strip, which is the form in which the raw material is usually obtained.

Figure 3:
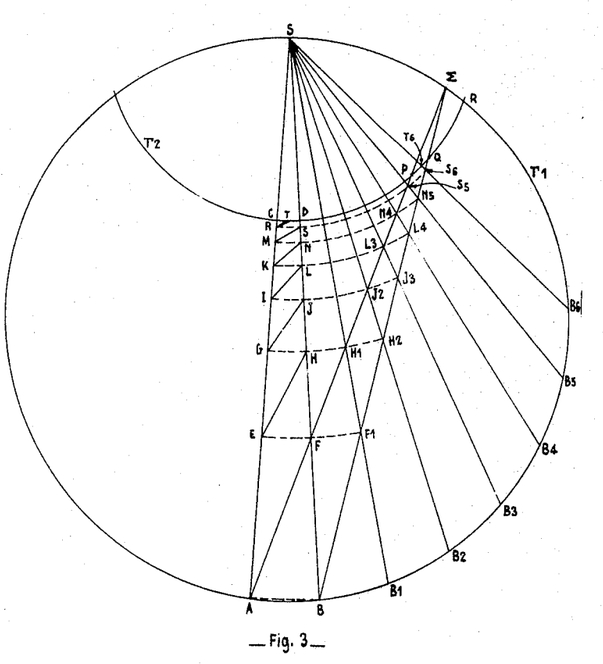
FIGURE 3 represents the layout of a strip, the winding of which will constitute the tube obtained according to one embodiment of the invention.

In the first example of the application of this method represented in FIGURE 3, the evoluted surface of the cone frustum it is desired to obtain is traced on ABDC.

$\widehat{AB}$ and $\widehat{CD}$ are the large and small curvilinear bases of this surface, respectively. The rectilinear sides AC and BD are extended to intersect at S; then circle ($\Gamma 1$) passing through points S, A and B, and circle ($\Gamma 2$), having its center at S and passing through points C and D, are drawn. It will be noted that the distance between these curvilinear sides $\widehat{AB}$ and $\widehat{CD}$ is equal to:

$$l = \frac{h}{\cos \frac{\alpha}{2}}$$

On circle ($\Gamma 1$) a point $\Sigma$ is chosen located at the inside of the circle ($\Gamma 2$) and the straight lines $\Sigma A$ and $\Sigma B$ are drawn cutting circle ($\Gamma 2$) at P and Q, respectively.

The fan of straight lines $SB_1$, $SB_2$ ... $SB_6$ are drawn so that the following angles are equal:

$$\widehat{ASB} = \widehat{BSB_1} = \widehat{B_1SB_2} = \ldots \widehat{B_5SB_6}$$

The straight line AP cuts the various straight lines of the fan at points F, $H_1$, $J_2$, $L_3$, $N_4$, $S_5$, and the straight line BQ cuts them at points $F_1$, $H_2$, $J_3$, $L_4$, $N_5$, $S_6$, so that $FF_1$, $H_1H_2$, $J_2J_3$, $L_3L_4$, $N_4N_5$, $S_5S_6$, are respectively on the same circles of vertex S. These circles are extended so as to cut respectively the straight lines AC and BD at EF, GH, IJ, KL, MN, RS.

The following trapezes are then equal:

$BFH_1F_1 = AEHF$
$F_1H_1J_2H_2 = EGJH$
$H_2J_2L_3J_3 = GILJ$
$J_3L_3N_4L_4 = IKNL$ and so on (the small arcs of circles such as $\widehat{CD}$, $\widehat{AB}$, $\widehat{PQ}$ ... are similar to the corresponding chords).

The two trapezes ACDB and APQB thus have equal surfaces, with the triangle AFB being furthermore common to both.

The cone frustum having defined the trapeze ACDB may then be obtained by winding strip APQB, winding initially the large base to meet the points A and B.

The point $\Sigma$ can only be chosen on circle ($\Gamma 1$) at the inside of circle ($\Gamma 2$). The relation of the radii of these two circles must be somewhat great in order not to have too acute a winding angle at the base.

The strip with maximum length is obtained when $\Sigma$ is at the intersection R of the circles ($\Gamma 1$) and ($\Gamma 2$); they then have the form of a triangle RAB.

Figure 4:
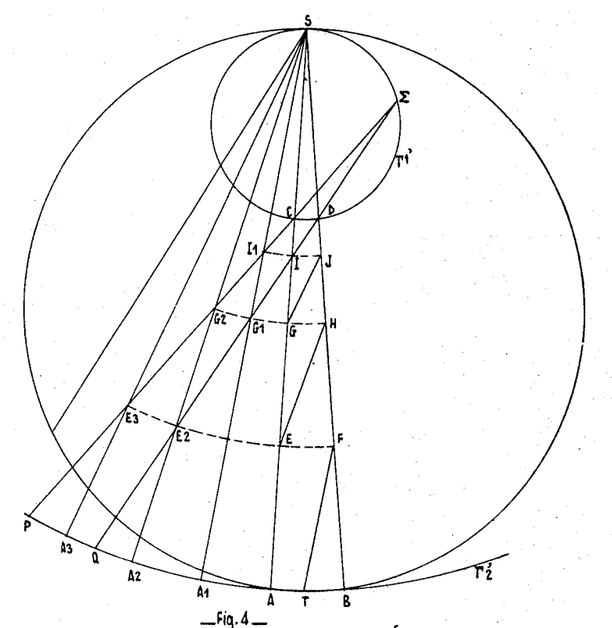
FIGURE 4 represents the same layout obtained according to a second embodiment.

In a second example of the application of the method of the invention represented in FIGURE 4, the roles of the two bases AB and CD are reversed.

Circle ($\Gamma 1$), now indicated by ($\Gamma' 1$) passes through S, C and D, while circle ($\Gamma 2$), now indicated by ($\Gamma'' 2$), having its center at S passes through A and B. The point $\Sigma$ is chosen on circle ($\Gamma' 1$) and the straight lines $\Sigma C$ and $\Sigma D$ are drawn cutting respectively circle ($\Gamma'' 2$) at P and Q. Here again the trapezes ACDB and PQDC have equal surfaces.

Straight lines $SA_1$, $SA_2$, $SA_3$ ... are drawn in a fan in such a way that the following angles are equal:

$$\widehat{BSA} = \widehat{ASA_1} = \widehat{A_1SA_2} = \widehat{A_2SA_3} = \ldots$$

The rectilinear line CP cuts the various straight lines of the fan at points $I_1$, $G_2$, $E_3$ ... while the rectilinear line DQ cuts them at I, $G_1$, and $E_2$ .... The arcs of a circle with center S passing respectively through $E_3$, $G_2$, $I_1$ are then drawn; they cut SA at E, G, I, and SB at F, H, J.

The triangle CDI is common to the two trapezes.

Trapezes $G_1I_1CI$ and GIDJ are equal, as also trapezes $E_2G_2I_1G_1$ and EGJH.

If we draw a straight line FT through F so that the angles $\widehat{TFB}$ and $\widehat{PE_3A_3}$ are equal, we note that triangles TFB and $PE_3A_3$ are equal as are the quadrilaterals AEFT and $A_3E_3E_2Q$.

The cone frustum having defined the trapeze ACDB can then also be obtained by winding the strip CPQD, winding initially the lesser base to join the points C and D.

Figure 5:
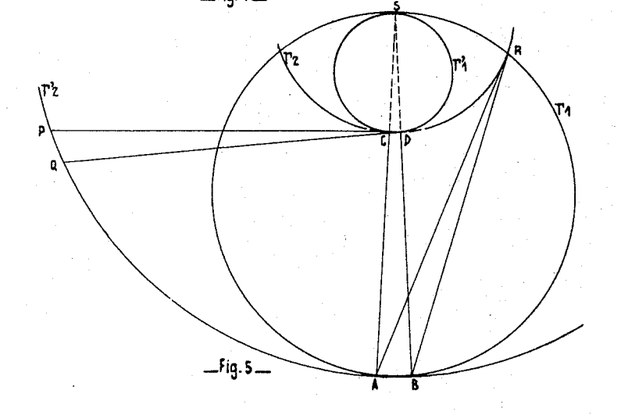
FIGURE 5 represents the layout in a special case of a strip whose winding will constitute the tube, according to the two embodiments indicated above.

In the example represented in FIGURE 5, the point $\Sigma$ must always be on the small circle SCD, that is to say ($\Gamma' 1$), and it must be enclosed between S and D. The strip of maximum length is obtained when $\Sigma$ is located at D, the two large sides then being respectively the extension of CD and the tangent at D to the circle ($\Gamma' 1$); it then presents the form of a triangle.

For the construction of a given cone frustum by helicoidal winding, there are thus two ways of determination, depending on whether we start from the small base or the large base of the curvilinear trapeze representing the evoluted surface of the cone frustum to be obtained. As the limit we might start from a triangle. FIGURE 5 represents the two equal triangles RAB and DPQ corresponding to the two borderline cases. If we arrange the two triangles RAB and DPQ so that, for example, R coincides with P, and A with D, we obtain a strip of constant width. Thus, we can obtain the two triangular strips RAB and DPQ by cutting a rectangular strip along its diagonal with the length equal to the greater of the lengths RA or RB. A slight adjustment of the bases is enough for obtaining by winding these strips two cone frustums which are identical.

It is also possible to define a continuous strip which constitutes successive trapezes permitting formation of similar cone frustums by constructing them successively from the large and the small base; it appears to be preferable then, however, to go progressively from one definition to the other by constructing intermediate cylindrical parts.

Figure 6:
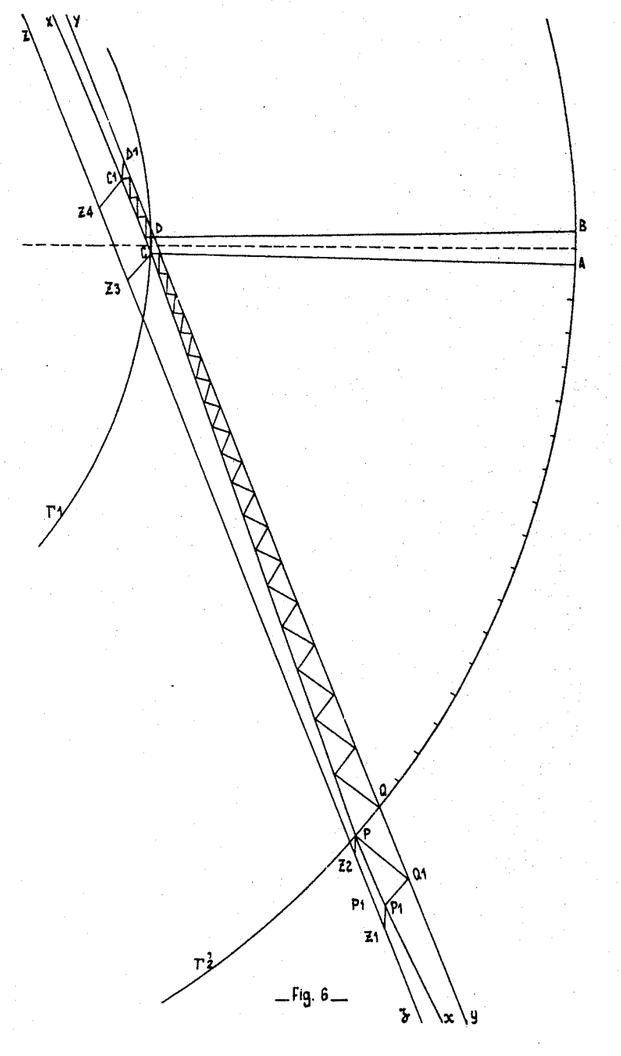
FIGURE 6 represents the outline of a strip with rectilinear and parallel edges and of the broken line along which the strip should be cut to obtain two strips, which will serve for the manufacture of truncated cone shaped tubes.

FIGURE 6 indicates how this can be resolved from the source, that is, from the evolute surface ABCD of the cone frustum to be obtained. Strip CDPQ, whose winding permits the obtaining of the cone frustum, is made as has been explained above. We then have:

$CZ_3$ parallel and equal to PQ
$PZ_3$ parallel and equal to CD

The two triangles $Z_3CD$ and $QPZ_2$ are equal and the straight lines $Z_2Z_3$ and QD are parallel. In cutting along PC, the strip with parallel edges $Z_2PQDCZ_3$, two equal quasitrapezoidal strips PQDC and $Z_2PCZ_3$ are obtained which permit the manufacture of two equal cone frustums by winding.

To obtain strips of considerable length, it suffices to extend each base of the strip PQDC by an equal but opposite strip. It is preferable to interpose between two strips of opposite convergence, a rectangular portion, such as, on the one hand, $PQP_1Q_1$ and $CDC_1D_1$ for the strip PQCD and, on the other hand, $Z_1P_1Z_2P$ and $CZ_3Z_4C_1$ for the strip $Z_2PCZ_3$.

Thus, it is sufficient to cut out the strip with parallel edges zyZY along the broken line $xP_1PCC_1X$ ... to obtain two strips yYxX and zZxX, each of which has a rectilineal edge yY and zZ, respectively, and a broken edge which is cut for the two strips according to line $xP_1PCC_1X$. Each of these strips permits the obtaining of cone frustums by edge to edge winding, in a succession of large base against large base, or small base against small base, each cone frustum being separated from the following one by a cylindrical part as large as is desired. It goes without saying that the cylindrical part may be omitted.

The manufacture of truncated cone tubes from strips cut according to the method described is particularly easy and can be undertaken by hand. It is enough, indeed, to make a starting point for the spirals being wound edge to edge, which form, after welding, a rigid whole having the desired shape. A rudimentary support is useful for correcting any slight errors in shaping.

It is to be noted that a side of the strip is used as reference and not its axis, as was indicated in the previous technique; the application of the method is considerably facilitated by this.

Figure 7:
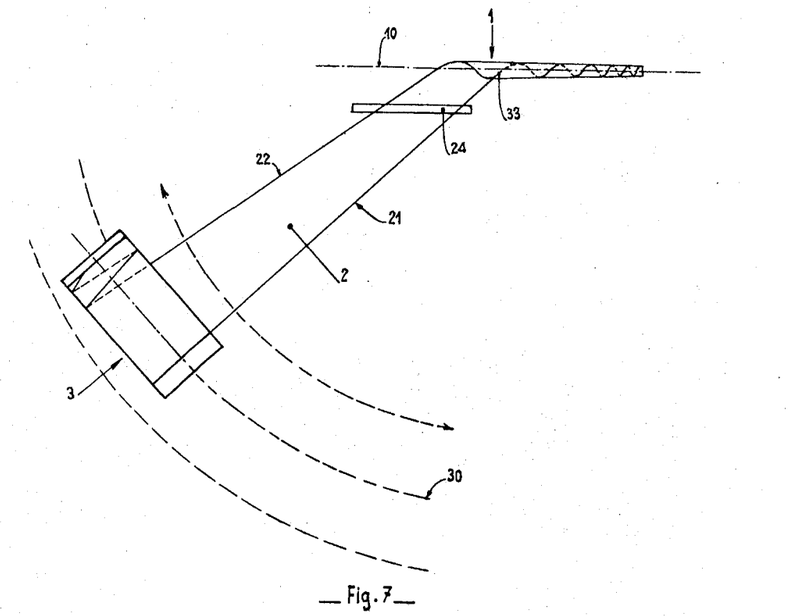
FIGURE 7 is a plan view and FIGURE 8 is a view in elevation.
Figure 8:
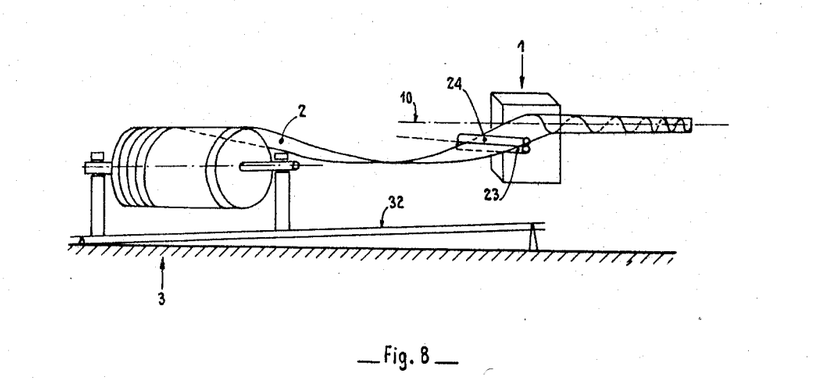

The manufacture can also be accomplished on a machine according to the method illustrated in FIGURES 7 and 8.

The machine comprises a mandrel with variable profile 1 on which strip 2 is wound, as well as a feed drum 3 which supplies the machine. The whole assembly of the tube made rotates on the exit axis 10 of the tube. The strip 2 includes a rectilinear edge 21 and a non-aligned or broken edge 22. Before being wound on mandrel 1 it passes between two guide rollers 23 and 24 with parallel axes. The feed drum 3 is mounted on a mobile carrier which permits it to move along the arc of a circle 30 whose center 33 is on axis 10. The carrier 31 moves along its travel-path 32 inclined in relation to the ground to which axis 10 is assumed parallel.

To form a conical tube the three following parameters must be arranged:

$\delta$, the feed angle seen in plan view of the machine, that is to say, the angle which forms the rectilinear edge 21 of the strip 2 with the exit axis 10 of the tube;

$\gamma$, the feed angle seem in elevation, that is, the angle which makes, with the horizontal plane, the common direction of the axes of the rollers 23 and 24, a direction which is parallel to the vertical plane containing the axis 10;

$\lambda$, the angle which the travel route 32 of the feed drum makes with the ground.

Referring to FIGURE 4, we can choose as a starting point the side DQ, for example. We find then that the angle $\delta$ must be equal to the angle BDQ at the moment at which winding starts at CD; it should be equal to AIQ at the moment when the winding reaches $I_1I$, to $A_1G_1Q$ at the moment when $G_2G_1$ is reached, and so on. It decreases then for each spiral wound by an angle equal to $\widehat{ASB}$, the angle of the fan of straight lines of vertex S. The carrier 3 thus moves around point 33 according to a movement of angular velocity proportional to the velocity of the winding of the strip at the time of manufacture of a cone frustum. This movement is made in one direction for diverging cones and in the contrary direction for converging cones; it is reduced to zero at the end of the course at the time of the making of the cylindrical parts.

The angle $\gamma$ should be equal to the half angle at the vertex of the cone frustums released from the machine. It takes successively the values:

$\alpha/2$ for a divergent cone frustum
0 for the cylindrical part corresponding to the small bases
$\alpha/2$ for a convergent cone frustum
0 for the cylindrical part corresponding to the large bases As the height of the feed drum above the ground must be a function of the angle $\delta$, the incline $\lambda$ of the travel path is deduced at the end from the value of $\alpha$ and the form of the strips.

Figure 9:
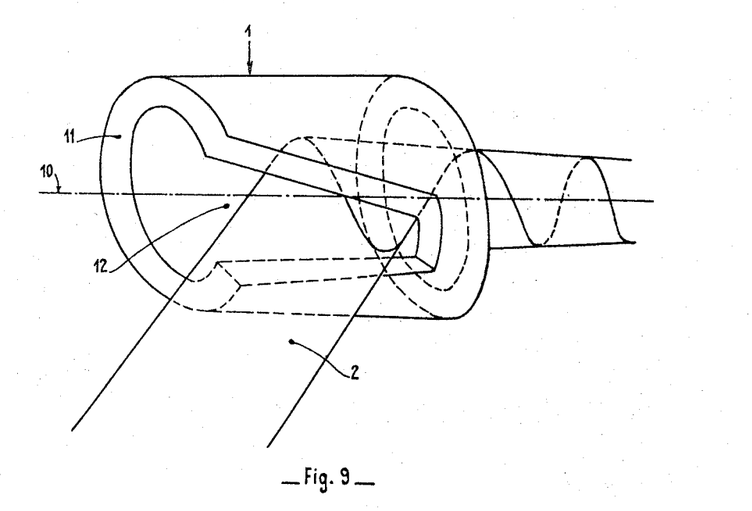
FIGURE 9 represents the formation of the tube inside a split cylinder for guiding purposes.

FIGURE 9 represents a device for formation of successive spirals inside a fixed cylinder 11, which is provided with a wide split 12 permitting the input of the strip 2 and the assembling edge to edge of the spirals formed. This assembling can be effected in any known way, the simplest being welding by continuous weld edge to edge, or spot welding, or edge on edge with electric milling, and the like. However, other means can be used, such as pinning, or, if a narrow strip is used covering the joint between spirals, riveting, glueing, and the like.

Figure 10:
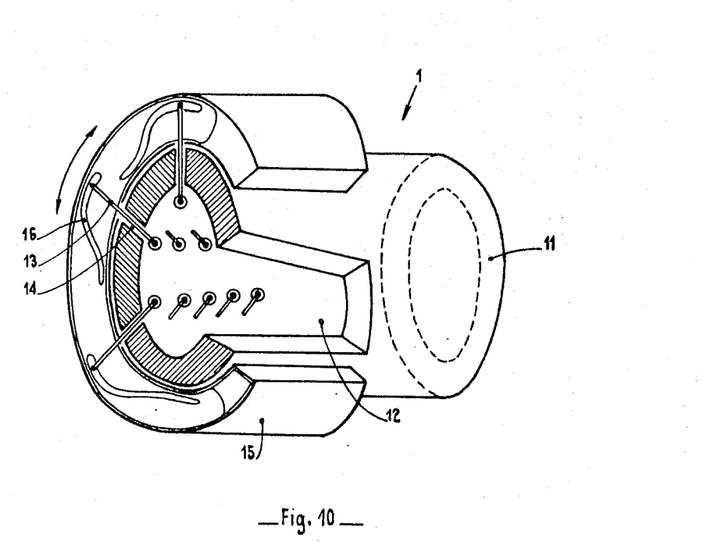
FIGURE 10 represents the mandrel with variable profile.

As a diameter of exit is always variable, the formation of successive spirals can be aided by a process of guiding, such as that shown in FIGURE 10.

The split cylinder 11 has an inside diameter definitely greater than the greatest base diameter of the cone frustums to be made. Guiding is effected by means of shafts, shanks, or rods, on rollers or ball bearings, distributed according to certain diameters and certain generatrixes. Each of these rods, such as 13, traverses the cylinder 11 through an aperture, such as 14, and penetrates into a housing 15 surrounding the cylinder 11.

This housing contains a system of cams, similar but staggered one in relation to the other; thus, the end of rod 13 is guided by cam 16. This cam 16 comprises two circular parts connected by an oblique part. The outside circular part corresponds, in the tube obtained, to the cylinder of a large base, the oblique part corresponds to the cone frustum, and finally the inside cylindrical part corresponds to the small base cylinder. These circular parts are centered on the axis of cylinder 11. The housing 15 is thus actuated by a to-and-fro movement around the axis of cylinder 11, this movement being synchronized with that of the winder 3.

Guiding and cutting of the conical tubes can be effected by any method suited to the local arrangements in the manufacturing shops.

Figure 11:
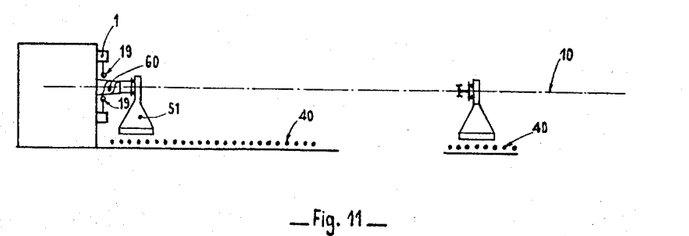
FIGURES 11, 12 and 13 represent schematically three phases of the manufacture of a double truncated cone tube.
Figure 12:
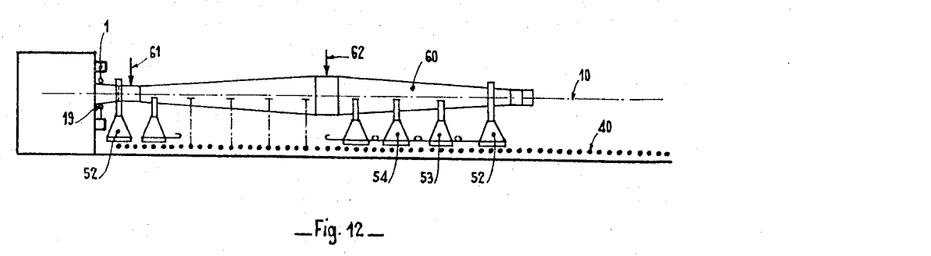
Figure 13:
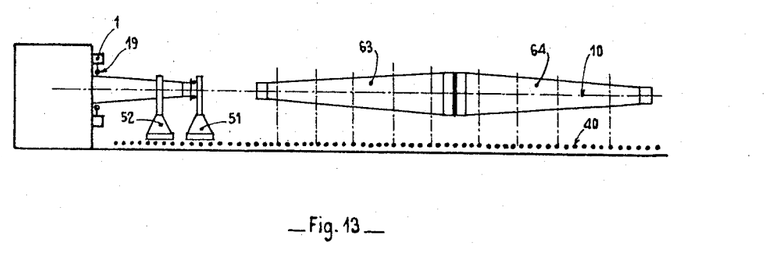

FIGURES 11 to 13 represent, as an example, an arrangement which can be adopted to advantage.

The tubes 60 are guided and maneuvered with the help of carriers placed on roller bearer 40. A transport system by conveyor belt or scraper-conveyor would do just as well.

At the start, guiding is effected by means of a carrier 51 having a vertical cover provided with a thrust ball bearing and an element capable of penetrating to the inside of the first cylinder, which is preferably the one corresponding to the smaller of the two bases. The tube 60 is, furthermore, centered at the outlet of the mandrel with variable profile 1 by stops adjustable according to the exit program.

Gradually, with the departure of the tube 60, the following carriers are put in place: The first carrier 52 surrounds preferably the first cone frustum. It has a removable upper part and is provided with four rollers forming a square located on a plane perpendicular to the axis of the cone. The following carriers 53, 54 . . . are merely supports on which the tube rests. Each of them has at least two rollers (roller-wheels) with horizontal axis, the two axes being located in the same horizontal plane. These carriers are connected so that the whole assembly moves, carried along by the tube itself. When several carriers 53, 54 . . . are in place, carrier 51 is removed.

When an assembly 60 of two cone frustums is turned out, cutting is proceeded with along lines 61 and 62. The two completed tubes 63 and 64 are then removed and the carriers 52, 53, 54 . . . are recovered to come to support the following tubes, carrier 51 being put in its place at once, as soon as the cutting is achieved 61.

The extremities of the shafts or rods 13 constitute the mandrel for winding the strip 2. They must be so constituted as not to offer any appreciable resistance to the movement of the strip. They may consist of a roller suitably orientated or, better yet, of a ball bearing able to turn in any direction. More simply, the end of each shaft or rod can be tooled to the shape of a sphere, these spheres being either composed of a self-lubricating material, such as a plastic substance (polyamide, etc.), or a metal substance (an alloy of aluminum and tin, for example), or be lubricated by application of outside matter.

Such tubes can be made from various materials, e.g. metals, such as steel, brass, zinc, aluminum and its alloys, magnesium and its alloys, etc., or from plastics; polyvinyl chloride is very suitable.

When aluminum alloy is used, welding can be done by argon arc spot welding. When esthetic problems are not involved, the welding can be done by joint (planning).

The tubes produced by soldering show a ridge of raised soldering; technically there is no reason they cannot be used just as they are.

When it is desired to obtain tubes of decorative appearance, the traces of welding or assembling can be eliminated by milling or by any other mechanical or chemical process. A continuous process can be utilized, for example, buffing of the strip as fast as the tubes are turned out. A covering is necessary on stainless steel because welding on this metal is accompanied by a blackish or bronze colored rim.

A particularly important use of these tubes is in the manufacture of posts, more especially standards for lamps to light public thoroughfares or factories.

The bands can be prepared in advance, separately. They can also be manufactured immediately before applying the machine. This last solution applies particularly when continuous manufacture of tubes is desired.

In this case, a regulating system can be utilized using a registering apparatus with a director-head having two pens and a continuous winding band. One of these pens presses on a profile identical with the profile required, cut out, for example, on heavy paper or on an aluminum strip.

These strips can be prefabricated by using a form which unwinds at the same time as the band and above it, to serve as a guide.

Although the present invention has been described with a certain degree of particularity, it is understood that the present disclosure has been made only by way of example and that numerous changes in the details of construction and the combination and arrangements of parts may be resorted to without departing from the spirit and the scope of the invention as hereinafter claimed.

What is claimed is:

1. A method of manufacturing conical tubes in which a strip of variable width having substantially the shape of an elongated trapeze is produced, said strip being then wound in a pseudo-helix of continually variable diameter, and the adjacent edges of said strip being thereafter joined, which comprises tracing the evoluted surface of a cone frustum, said cone frustum having rectilinear sides AC and BD, curved bases CD and AB, and vertex angle $\alpha$, extending the rectilinear sides AC and BD to their intersection at S, circumscribing one circle ($\Gamma 1$) about the triangle formed by S and the vertices of one of the bases of said cone frustum and another circle ($\Gamma 2$) having its center at S and passing through the vertices of the other base of said cone frustum, taking a point $\Sigma$ on said circle ($\Gamma 1$), joining said point $\Sigma$ to the two vertices of the base of said cone frustum through which circle ($\Gamma 1$) passes, thereby obtaining two straight lines cutting said circle ($\Gamma 2$) at points P and Q, respectively, cutting a strip according to the curvilinear trapeze limited by the straight lines $\Sigma P$ and $\Sigma Q$ and the circles ($\Gamma 1$) and ($\Gamma 2$), winding said strip as a pseudo-helix of continually variable diameter, said strip forming with the axis of said pseudo-helix an angle equal to $\pi$ sine $\alpha/2$ radians.

2. The method of claim 1, in which the circle ($\Gamma 1$) passes through the vertices of the smaller of the two bases of said cone frustum, and the circle ($\Gamma 2$) through the vertices of the larger of the two bases of said cone frustum.

3. The method of claim 2, in which one of the vertices of the smaller base of said cone frustum is taken for said point $\Sigma$.

4. The method of claim 1, in which the circle ($\Gamma 1$) passes through the vertices of the larger of the two bases of said cone frustum, and the circle ($\Gamma 2$) through the vertices of the smaller of the two bases of said cone frustum.

5. The method of claim 4, in which one of the points common to the circles ($\Gamma 1$) and ($\Gamma 2$) is taken for said point $\Sigma$.

6. The method of claim 1, in which strips are made successively, small base against small base for the first and second strip, large base against large base for the second and third strip and so on, the strip obtained having a rectilinear edge.

7. The method of claim 2, in which strips are made successively, small base against small base for the first and second strip, large base against large base for the second and third strip and so on, the strip obtained having a rectilinear edge.

8. The method of claim 3, in which strips are made successively, small base against small base for the first and second strip, large base against large base for the second and third strip and so on, the strip obtained having a rectilinear edge.

9. The method of claim 4, in which strips are made successively, small base against small base for the first and second strip, large base against large base for the second and third strip and so on, the strip obtained having a rectilinear edge.

10. The method of claim 5, in which strips are made successively, small base against small base for the first and second strip, large base against large base for the second and third strip and so on, the strip obtained having a rectilinear edge.

11. The method of claim 6, in which a strip with rectilinear and parallel edges is used which is cut according to a broken line so as to obtain two identical strips permitting the obtaining by winding of two truncated conical tubes.

12. The method of claim 7, in which a strip with rectilinear and parallel edges is used which is cut according to a broken line so as to obtain two identical strips permitting the obtaining by winding of two truncated conical tubes.

13. The method of claim 8, in which a strip with rectilinear and parallel edges is used which is cut according to a broken line so as to obtain two identical strips permitting the obtaining by winding of two truncated conical tubes.

14. The method of claim 9, in which a strip with rectilinear and parallel edges is used which is cut according to a broken line so as to obtain two identical strips permitting the obtaining by winding of two truncated conical tubes.

15. The method of claim 10, in which a strip with rectilinear and parallel edges is used which is cut according to a broken line so as to obtain two identical strips permitting the obtaining by winding of two truncated conical tubes.

16. An apparatus for manufacturing conical tubes from strip, which comprises a mobile drum for feeding strip, said drum having a curved travel path inclined to the horizontal, a mandrel with variable profile having at least one cylinder, said cylinder being at least partially split according to a generatrix and in which the winding of the strip is effected, and at least two guide rollers for receiving the strip from said drum and guiding the strip from said drum to said cylinder, said guide rollers being inclined to the horizontal at an angle equal to half the angle of the vertex of the desired conical tube.

17. An apparatus for manufacturing conical tubes from strip, which comprises a mobile drum for feeding strip, said drum having a curved travel path inclined to the horizontal, a mandrel with variable profile having at least one cylinder, said cylinder being at least partially split according to a generatrix and in which the winding of the strip is effected, said cylinder having an inside diameter greater than the greatest diameter of the conical tubes to be manufactured, and being provided with at least one orifice, at least one guide rod adapted to be engaged in said orifice, a carriage actuated with a to-and-fro movement surrounding said cylinder, at least one cam integral with said carriage and adapted to engage the exterior end of said guide rod, means for facilitating sliding of the strip on the inside extremity of said guide rod, and at least two guide rollers for receiving the strip from said drum and guiding the strip from said drum to said cylinder, said guide rollers being inclined to the horizontal at an angle equal to half the angle of the vertex of the desired conical tube.

18. The apparatus of claim 17, in which said mandrel has stops for centering the exiting tube.

19. The apparatus of claim 17, which comprises carriers for transporting the tubes away from said mandrel, means for conveying said carriers, the first carrier having a vertical plate provided with a roller bearing stop and an element adapted to penetrate inside the end of the tube, at least one carrier surrounding the first cone frustum, and having a removable upper part and at least four rollers, said rollers forming a square located on a plane perpendicular to the axis of the tube, at least one carrier having at least two horizontal rollers, and means for connecting said carriers so that they move drawn by the tube itself.

20. An apparatus for manufacturing conical tubes from strip, which comprises a mobile drum for feeding strip, said drum having a curved travel path inclined to the horizontal, a mandrel with variable profile having at least one cylinder, said cylinder being at least partially split according to a generatrix and in which the winding of the strip is effected, said cylinder having an inside diameter greater than the greatest diameter of the conical tubes to be manufactured, and being provided with at least one orifice, at least one guide rod adapted to be engaged in said orifice, a carriage actuated with a to-and-fro movement surrounding said cylinder, at least one cam integral with said carriage and adapted to engage the exterior end of said guide rod, means for facilitating sliding of the strip on the inside extremity of said guide rod, at least two guide rollers for receiving the strip from said drum and guiding the strip from said drum to said cylinder, said guide rollers being inclined to the horizontal at an angle equal to half the angle of the vertex of the desired conical tube, stops on said mandrel for centering the exiting tube, carriers for transporting the tubes away from said mandrel, means for conveying said carriers, the first carrier having a vertical plate provided with a roller bearing stop and an element adapted to penetrate inside the end of the tube, at least one carrier surrounding the first cone frustum, and having a removable upper part and at least four rollers, said rollers forming a square located on a plane perpendicular to the axis of the tube, at least one carrier having at least two horizontal rollers, means for connecting said carriers so that they move drawn by the tube itself, and automatic regulating means for preparing the strip having a director-head with two pens and a continuous winding band, one of said pens being adapted to press on a profile identical with the profile required.

References Cited

UNITED STATES PATENTS

| | | | |
|---|---|---|---|
| 271,740 | 2/1883 | Root | 72—49 X |
| 2,339,219 | 1/1944 | Crowley | 72—138 |
| 2,794,409 | 6/1957 | Freeze | 72—49 X |
| 3,210,980 | 10/1965 | Sengel | 72—135 |

CHARLES W. LANHAM, *Primary Examiner.*

K. C. DECKER, *Assistant Examiner.*